(12) United States Patent
Dunker et al.

(10) Patent No.: US 8,566,880 B2
(45) Date of Patent: Oct. 22, 2013

(54) DEVICE AND METHOD FOR PROVIDING A TELEVISION SEQUENCE USING DATABASE AND USER INPUTS

(75) Inventors: Peter Dunker, Schwarza (DE); Uwe Kuehhirt, Viernau (DE); Andreas Haupt, Erfurt (DE); Christian Dittmar, Ilmenau (DE); Holger Grossman, Uterpoerlitz (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 149 days.

(21) Appl. No.: 13/011,563

(22) Filed: Jan. 21, 2011

(65) Prior Publication Data
US 2011/0179452 A1   Jul. 21, 2011

Related U.S. Application Data

(63) Continuation of application No. PCT/EP2009/004948, filed on Jul. 8, 2009.

(60) Provisional application No. 61/082,773, filed on Jul. 22, 2008.

(30) Foreign Application Priority Data

Aug. 27, 2008   (DE) .......................... 10 2008 044 635

(51) Int. Cl.
*G06F 3/00*   (2006.01)

(52) U.S. Cl.
USPC ................... 725/53; 725/49; 725/50; 725/51; 725/52; 725/59; 704/260; 704/E13; 386/278; 386/279; 386/280; 386/281; 386/282; 386/283; 386/284; 386/285; 386/286; 386/287; 386/288; 386/289; 386/290

(58) Field of Classification Search
None
See application file for complete search history.

(56) References Cited

U.S. PATENT DOCUMENTS

| | | | |
|---|---|---|---|
| 5,233,438 A | 8/1993 | Funahashi et al. | |
| 5,835,667 A * | 11/1998 | Wactlar et al. | 386/241 |
| 6,133,912 A * | 10/2000 | Montero | 715/716 |
| 6,144,375 A * | 11/2000 | Jain et al. | 715/251 |
| 6,230,162 B1 * | 5/2001 | Kumar et al. | 382/240 |
| 6,321,383 B1 | 11/2001 | Funahashi et al. | |

(Continued)

FOREIGN PATENT DOCUMENTS

| | | |
|---|---|---|
| CA | 2343071 | 3/2000 |
| DE | 19841683 | 5/2000 |

(Continued)

*Primary Examiner* — Nasser Goodarzi
*Assistant Examiner* — Paul Graham
(74) *Attorney, Agent, or Firm* — Michael A. Glenn; Perkins Coie LLP

(57) ABSTRACT

A device for providing a television sequence has a database interface, a search request receiver, a television sequence rendition module and an output interface. The database interface accesses at least one database, using a search request. The search request receiver is formed to control the database interface so as to acquire at least audio content and at least image content separate therefrom via the database interface for the search request. The television sequence rendition module combines the separate audio content and the image content to generate the television sequence based on the audio content and the image content. The output interface outputs the television sequence to a television sequence distributor.

19 Claims, 6 Drawing Sheets

(56) References Cited

U.S. PATENT DOCUMENTS

| | | | |
|---|---|---|---|
| 6,463,444 B1 * | 10/2002 | Jain et al. .............................. 1/1 |
| 7,079,176 B1 * | 7/2006 | Freeman et al. ........... 348/207.1 |
| 7,386,553 B2 * | 6/2008 | Itoh et al. .............................. 1/1 |
| 7,613,613 B2 * | 11/2009 | Fields et al. ................... 704/272 |
| 7,673,321 B2 * | 3/2010 | Yurt et al. ...................... 725/114 |
| 7,818,773 B2 * | 10/2010 | Yurt et al. ........................ 725/93 |
| 7,974,714 B2 * | 7/2011 | Hoffberg ......................... 700/94 |
| 2002/0069218 A1 * | 6/2002 | Sull et al. ..................... 707/501.1 |
| 2004/0103433 A1 * | 5/2004 | Regeard et al. ................. 725/53 |
| 2004/0197088 A1 * | 10/2004 | Ferman et al. ................ 386/117 |
| 2005/0028194 A1 * | 2/2005 | Elenbaas et al. ................ 725/32 |
| 2006/0271976 A1 * | 11/2006 | Yurt et al. ........................ 725/87 |
| 2007/0028278 A1 | 2/2007 | Sigmon, Jr. et al. |
| 2007/0033533 A1 * | 2/2007 | Sull ............................... 715/752 |
| 2008/0065695 A1 * | 3/2008 | Adstedt et al. ............. 707/104.1 |
| 2008/0155624 A1 * | 6/2008 | Yoon et al. .................... 725/109 |
| 2010/0107194 A1 * | 4/2010 | McKissick et al. ............. 725/40 |

FOREIGN PATENT DOCUMENTS

| | | |
|---|---|---|
| EP | 1191460 | 3/2002 |
| GB | 2444284 | 6/2008 |
| JP | 2001084743 | 3/2001 |
| JP | 2006293246 | 10/2006 |
| JP | 2007/142729 | 6/2007 |
| JP | 2007/209023 | 8/2007 |
| WO | WO 02/32144 | 4/2002 |
| WO | WO 2004/105035 | 12/2004 |
| WO | WO 2006/073281 | 7/2006 |

* cited by examiner

DEVICE AND METHOD FOR PROVIDING A TELEVISION SEQUENCE USING DATABASE AND USER INPUTS

CROSS-REFERENCE TO RELATED APPLICATIONS

This application is a continuation of copending International Application No. PCT/EP2009/004948, filed Jul. 8, 2009, which is incorporated herein by reference in its entirety, and additionally claims priority from U.S. Application No. 61/082,773, filed Jul. 22, 2008, and DE 102008044635.1, filed Aug. 27, 2008, which are all incorporated herein by reference in their entirety.

BACKGROUND OF THE INVENTION

Embodiments of the present invention related to a device and a method for providing a television sequence, and particularly to automated generation of services and broadcast sequences for analog and digital television and for television via Internet (IPTV=Internet Protocol Television).

Presently, a wide range of interactive television services are available. The kinds of applications may be categorized by different taxonomies: locally-individual interactive applications without return channel (information services), completely individual interactive applications with return channel (home shopping) or mass-interactive applications (voting applications). For example, an alternative categorization would be as follows: applications belonging to television broadcasting (quiz applications in parallel with television quiz shows), applications independent of television broadcasting (TV operator service portals) or television broadcasting transmission applications (mobile message transmission applications, such as chat applications).

What is particularly interesting are mobile message transmission services in connection with interactive broadcast production services, such as the television show "Mess TV" of the Norwegian television, incorporating SMS or MMS messages (SMS=short message service; MMS=multimedia message service) sent or having been sent directly to everyone's television screen via mobile telephones so as to communicate with show hosts. Furthermore, MMS messages are displayed on the screen so as to more strongly involve viewers in the television show. Further interactive television broadcasts based on SMS and MMS communication can be found.

Hence, there is a need for novel enhancement strategies of interactive television services, utilizing mobile message transmission with collaborative and content-based filter methods.

Conventionally, there are some approaches, however, only partially doing justice to this need. WO/2002/032144 discloses a device and a method for encoding, transmitting and receiving image and video content, but without automated and content-based generation of the image and video content taking place. U.S. 2008155624, JP 2007209023, JP 2007142729 and GB 2444284 disclose devices and methods, which indeed serve a similar purpose, but do not apply content-based methods. Rather, the focus is on providing recommendations of contents for editors, who may then determine the sequences of the broadcast contents. The automated generation of the sequences with possible manual correction, if needed, does not take place. Or additional program information is analyzed to offer a user an enhanced electronic program guide (EPG), so that the users may compile the program themselves.

SUMMARY

According to an embodiment, a device for providing a television sequence may have: a database interface for accessing at least one database, using a search request; a search request receiver formed to control the database interface so as to acquire at least audio content and at least image content separate therefrom via the database interface for the search request wherein the audio content or the image content has content data; a television sequence rendition module for combining the separate audio content and the image content to generate the television sequence based on the audio content and the image content; and an output interface for outputting the television sequence to a television sequence distributor, wherein the device further has a memory to store the audio content or the image content and wherein the device is configured to classify the audio content or the image content corresponding to the content data, so that the audio content or the image content are classified regarding their contents, wherein the search request receiver is formed to query and acquire the further audio content and the further image content depending on the classification of the audio content or the image content regarding their contents, and wherein the television sequence rendition module is formed to additionally combine the further audio content or the further image content into the television sequence.

According to another embodiment, a method of providing a television sequence may have the steps of: accessing a database by a database interface, using a search request; controlling the database interface by a search request receiver to acquire at least audio content and at least image content separate therefrom via the database interface for the search request, wherein the audio content or the image content has content data;

combining the audio content and the separate image content by a television sequence rendition module to generate the television sequence based on the audio content and the separate image content; and outputting the television sequence by an output interface to a television sequence distributor, wherein the audio content or the image content is stored in a memory and the audio content or the image content is classified corresponding to the content data, so that the audio content or the image content are classified regarding their contents, wherein the further audio content and the further image content is queried and acquired depending on the classification of the audio content or the image content regarding their contents by the search request receiver, and wherein the further audio content or the further image content is additionally combined into the television sequence by the television sequence rendition module.

Another embodiment may have a computer program with program code for performing the inventive method, when the computer program is executed on a computer.

The present invention is based on the finding that automated provision of a television sequence is enabled by a database interface accessing at least one database, using a search term or a media sample or, more generally, a search request (search terms and media samples are examples for search requests), and further a search request receiver being formed to control the database interface. Via the database interface, at least audio content and at least image content separate therefrom are acquired for the search term or the media sample, wherein the audio content is combined with the image content in a television sequence rendering module so as to generate the television sequence. The television sequence thus is based on the audio content and the image content and is output to a television sequence distributor via an output interface.

A typical embodiment of the present invention, for example, describes an interactive television service generating a television program on the basis of simple search terms or keywords by scheduling multimedia data, which can be queried or acquired using the keywords by means of semantic indexing. For example, scheduling relates to temporally joining the individual contents, so that the television sequence is obtained. The process of this service can be subdivided into three steps:

Control of interactive services
Multimedia data acquisition
Television program generation Initiating (initially starting) the service can be brought about by way of a set of special keywords selected by an administrator of the television service. The control of interactive services is enabled by using a continuously updated keyword list created by the television viewers via SMS and mobile telephone or other possible return channels. Moreover, pictures received via MMS or telephone calls or received audio content of the viewers may also be used for further steps.

The keywords are used as a request within multimedia databases (acquisition systems) within the framework of a theme program, wherein the corresponding request leads to collecting multimedia data on the basis of keywords. Hence, the theme program automatically compiles multimedia material (image and audio material) matching a theme.

For example, the databases or data sources may include music, image or video content databases enhanced with content-based semantic descriptions obtained by means of automatic classification algorithms or catchword algorithms. Furthermore, collaborative picture communities, such as "Flickr", and the collaborative knowledge database "Wikipedia" can be queried with the keywords mentioned so as to get images and text information. When applying a speech-to-text recognition system, new keywords can be generated depending on the spoken audio content. Moreover, the images and the audio content of the viewer may be used to get additional multimedia elements in content-based image and audio search systems.

The third step is the most complicated one and focuses on the generation of television services, including the scheduling of multimedia data as well as the rendering (preparation) of the content. Rendering means establishing, e.g., a design for visual and auditory transitions or text overlays with additional information. Input material for the scheduling consists in images, videos, music or other audio content, text information and meta data with possible viewer identifications of the users responsible for individual multimedia content (since they provided the keywords, for example). For possible rendition of content, at first, e.g. text-to-speech conversion of the textual information is necessitated.

For scheduling music, videos and images, the original keywords can be used to show media elements with similar keywords at the same time. A more demanding approach is the content-based classification of special semantic concepts, such as atmosphere for all multimedia data, wherein the individual elements are arranged according to their atmospheric classification. Furthermore, an automatic content-based music segmenting algorithm is used to find refrain and stanza parts of a song. This information is used to analyze the atmospheric probabilities in individual segments of songs so as to precisely reproduce the song structure, as well as for the purpose of better adaptation of suitable images. The segment information may also be used to repeat the same images in each refrain of the music. On the basis of the described procedure, a sequence of media elements is compiled.

The next step is focused on the preparation of the exact scheduling and on transition effects. For extensive scheduling, an audio analysis algorithm for beat detection can be employed, so as to find the individual beat times for positioning the image transitions at the specific time instants. The kinds of image transition effects are treated in line with predefined atmospheric profile. Transitions in the calm and melancholy atmospheric region usually are cross-faded or faded in and out slowly. In an aggressive and euphoric region, hard cuts or quick fade-ins and fade-outs can be used. The rendition of content also includes a process of detecting human faces in images and correspondingly processing these images in a predefined manner, e.g. removing such images or overlaying the facial areas with fog, so as to protect privacy. In contrast thereto, the facial areas may explicitly appear in animations and zoom captures.

The last step in the rendition of the program may, for example, consist in working textual information into the video, which may, for example include additional information from Wikipedia or user names of multimedia elements obtained from proprietors (e.g. regarding a CreativeCommons licence and the attribute condition) or advertising.

The various aspects of the embodiments may also be described as follows.

Embodiments of the present invention include a method and a device allowing for automated and partially automated generation of broadcasting sequences and automated graphical and auditory rendition of contents for television and IPTV.

The photo, video, audio and textual contents utilized in embodiments may, for example, be compiled via a content-based search on the basis of image/audio/video samples in available information sources. Furthermore, it is possible to compile the photo, video and audio textual contents via a headword-based search, such as utilizing search requests, in available information sources (databases). The headword-based search may, for example, include content-based analyzing and automatic semantic indexing of audio material or video material.

Moreover, embodiments include the use of contents made available dynamically (for example by viewers or users) as dynamic control information for the adaptation of the broadcasting sequences, as well as the generation of special audio/video contents on the basis of the viewer or user contents. So as to enhance the interaction with the users or viewers, in particular, embodiments include the automated registering and administering of users, who may then be recognized when making contents available, as previously mentioned, for example.

Apart from the above-mentioned dynamic control information, which may also be generated via the contents made available by the viewers or users, for example, also static control information can be utilized. The static control information, for example, includes initial media data (audio, image, video and textual information), data sources, headwords or selected users or viewers or groups of registered users or viewers. Hence, all stored information (although the registered users or names of the databases) may be used as static control information. The specific initial static control information may further have associated therewith certain services, so that an individual broadcasting character is created. For example, fixed radio programs may be defined as audio material, for which image contents are compiled automatically, or only images from a defined image collection may be used.

Further embodiments include the use of the television sequence for digital television in all forms of propagation (e.g. via cable or satellite or as IPTV via Internet) and also for continuous video streams (video data stream) in live and/or pre-produced form. Thus, embodiments provide the possibilities of creating audio, photo and video sequences as well as matching combinations therefrom. Furthermore, matching combinations can be produced with the aid of methods of automated content-based audio, image and video classification and search.

Furthermore, embodiments include content-based temporal segmentation of video and audio material and the utilization of this information for rendering the sequences (e.g. rendering the transitions in cross-medial arrangements). As an example, it is to be mentioned that image material corresponding to a given music (e.g. quiet or melancholy music) is made available correspondingly, wherein a change in music may be accompanied by a change in the image material.

Furthermore, embodiments include the automatic content-based arranging of musical audio contents, using information from the content-based temporal segmentation on the basis of streaming image contents, as well as the automatic content-based arranging of image and video contents, using information from the content-based temporal segmentation of musical audio streaming contents.

Furthermore, embodiments include automated visual and auditory rendition of the media sequences, which may be performed in conjunction with the rendition of the transitions (between individual elements) and the cross-medial arrangements, in particular.

Further embodiments include possible later manual correction of the proposed and generated broadcasting sequences.

Besides, the production of transmission sequences, using locally available, collaboratively generated data sources (such as FLICKR.COM or the encyclopedia WIKIPEDIA) as well as publicly or commercially available, streaming-based audio, image, video and textual information as well as such an information dynamically made available by viewers or users.

In further embodiments, photo, video and audio contents are searched for with the aid of control information (e.g. by way of a search term designating a certain region or a country), or compiled and then integrated, if necessitated, into the transmission sequence in connection with a map illustration.

So as to integrate textual contents obtained from the Internet or the WIKIPEDIA encyclopedia into the broadcasting content, for example, a text-to-speech generation is performed in embodiments so as to convert the textual information to audio content. The corresponding textual information sources may be general databases or also the Internet.

As already mentioned, embodiments also include the use of search terms, which are automatically acquired from spoken or sung audio contents and utilized to query further media data connected thereto from databases. For example, the audio contents of a radio presenter or host can be examined such that the content thereof is supplemented correspondingly by image sources or image data.

The search terms may further be acquired from audio, image and video contents by way of classification of semantic contents or meta data or by voice recognition (speech-to-text module). The audio, image and video contents may also comprise content data but can be utilized for classification.

Further embodiments include fading in or playing in context-dependent additional information, which may include commercial fade-ins or textual information, for example. With reference to the above-mentioned example of geoinformation, corresponding commercial information thus can be transmitted to the respective region, e.g. by tour operators.

The textual information may, for example, be facts on cities, regions or other contents of the program.

In further embodiments, image or moving-picture contents may be arranged or combined with audio contents in a matching way, such that they have a common property, such as the same or similar atmosphere or genre. This may be done by way of automatic content-based classification of the visual and auditory contents (e.g. sunset or sunrise atmosphere with corresponding melancholy sounds). Arranging image and/or video contents with respect to continuous or streaming audio contents thus is done automatically and in a content-based manner.

Further embodiments include the generation of continuous image and video streamings by automatic content and metadata-based usage of a photo/video summary from a photo collection or from individual videos or multiple ones, with ensuing utilization when arranging audio contents to continuous image or video contents. Likewise, arranging audio contents to form continuous or streaming image or video contents may also be done automatically and in a content-based manner.

For example, a continuous audio stream and a multiplicity of image contents are acquired to obtain the television sequence by fading in the plurality of image contents into the continuous audio stream. Or conversely, in a further embodiment, an image sequence and a multiplicity of audio contents are acquired to obtain the television sequence by fading in the multiplicity of audio contents into the image sequence.

Furthermore, embodiments include the generation of a theme program service with textual information, for example, wherein the theme is defined by the search terms obtained as dynamic control information by users or viewers or in form of static control information, for example. The theme thus designed serves to acquire images from an image database, which images then are compiled to audio contents by automatically arranging and are arranged with matching audio contents into a sequence. Optionally, again visual and auditory rendition of the media sequences can be performed, which includes rendition of the transitions in the cross-medial arrangements, in particular.

Furthermore, as already noted, embodiments include the use of technology for detection of faces on images and individuals so as to select or ignore these contents in a targeted manner (protection of privacy) or highlight the facial areas or distort the facial areas.

Hence, embodiments are advantageous in that the enhancement strategies and service concepts shown, with a focus on things in common, necessitate the minimum production and maintenance effort possible for generating television broadcasts. This again leads to enormous cost savings.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
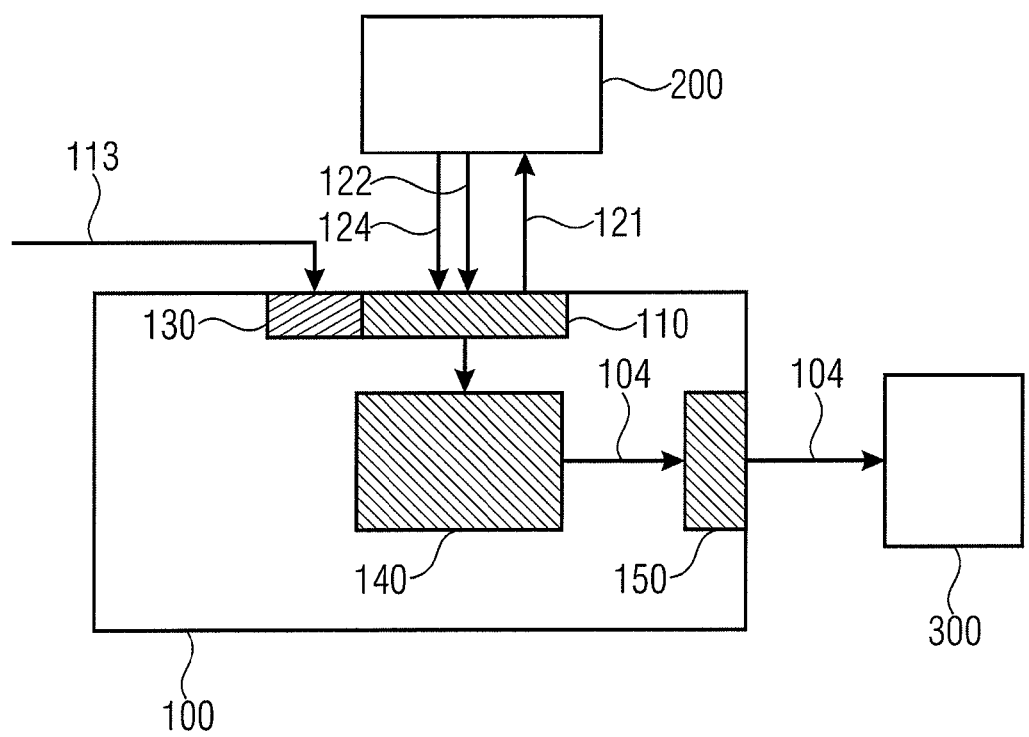
FIG. 1 is a schematic illustration of a device for providing a television sequence, according to embodiments of the present invention.

Before explaining the present invention in greater detail in the following on the basis of the drawings, it is pointed out that the same elements in the Figures are provided with the same or similar reference numerals, and that repeated description of these elements will be omitted.

FIG. 1 shows a first embodiment of a device 100 for providing a television sequence 104. The device 100 includes a database-interface 110 for accessing at least one database 200, using a search term or media sample 113 (or a generic search request or a BAVT search term). Furthermore, the device 100 includes a search request receiver 130 formed to control the database interface 110 so as to acquire at least an audio content 122 via the database interface 110 for the search term 113 and at least an image content 124 separate therefrom from a database 200 by a request 121. Apart from search terms, namely also media samples, such as special image or audio material, may be sent to a database as a request, wherein the database returns similar material (e.g. image and audio material in the same genre) as a response. Furthermore, the apparatus 100 includes a television sequence rendition module 140 for combining the separate audio content 122 and the image content 124 in order to generate the television sequence 104 on the basis of the audio content 122 and the image content 124. Finally, the device 100 includes an output interface 150 for outputting the television sequence 104 to a television sequence distributor 300.

The search request receiver 130 may optionally comprise several inputs so as to receive search terms including both static control information and dynamic control information.

Furthermore, the database 200 may comprise several parts or databases separate from each other, so that audio data 122 and image data 124 are queried from different databases. The database interface 110 thus may send queries 121 to different databases 200, to which end the database interface 110 includes an interface with the Internet or with a telephone network (mobile or fixed network), for example.

Figure 2:
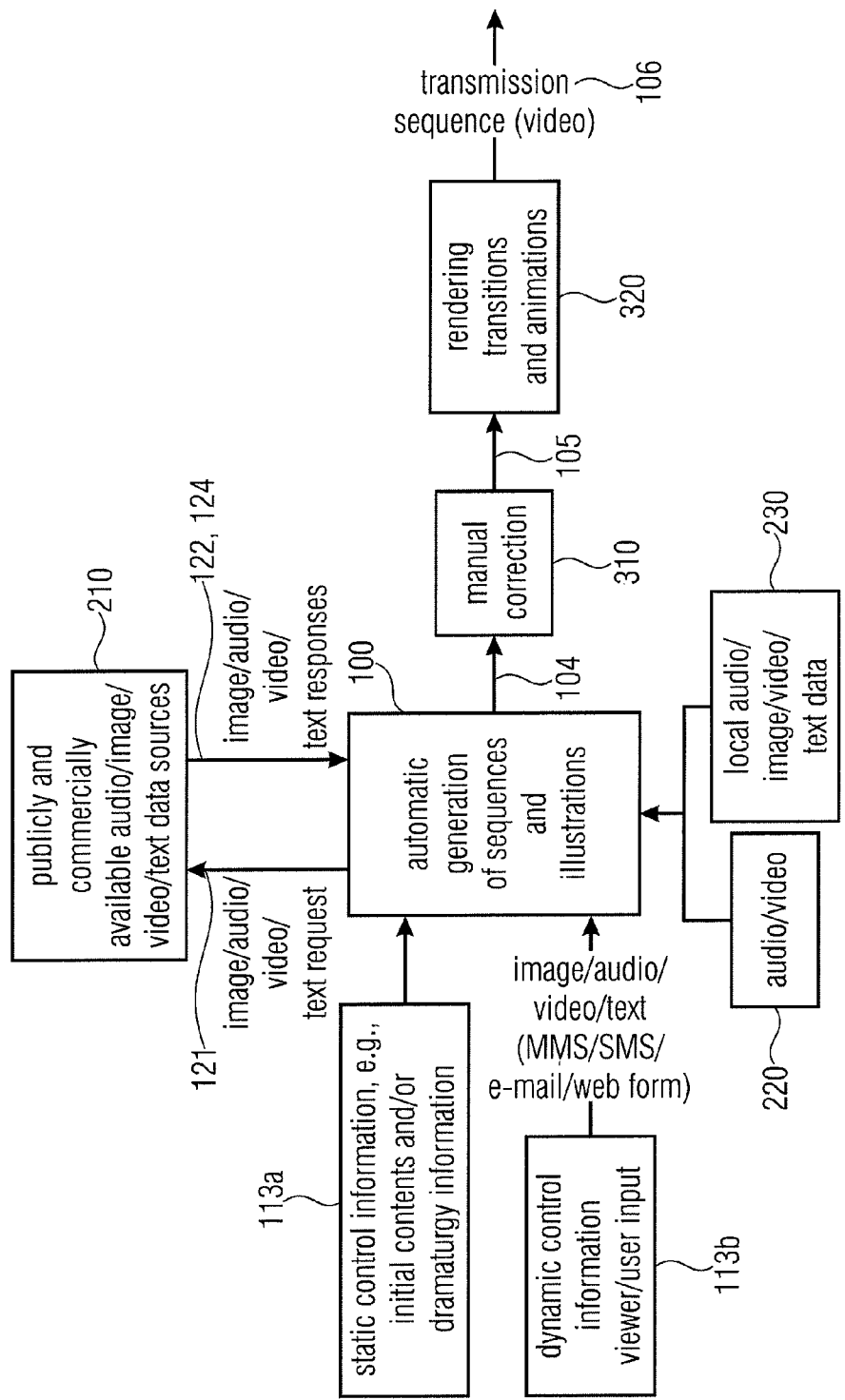
FIG. 2 is a schematic illustration with further details, according to further embodiments.

FIG. 2 shows an embodiment comprising further optional components. The database 200 optionally comprises three data sources, wherein a first data source 210 is a publicly and commercially available image/audio/video/textual data source (BAVT=Bild/Audio/Video/Text=image and/or audio and/or video and/or text; Bild=image), a second data source 220 further optionally representing a source for an audio/video stream, and a third data source 230 being a source for local BAVT data. The request 121 may here, for example, comprise search terms for special BAVT information, and the response of the first data source 210 may then—if available—include requested BAVT data.

In the embodiment of FIG. 2, the search terms 113 are subdivided into static control information 113a and dynamic control information 113b. The static control information 113a for example includes initial contents or dramaturgical information. The dynamic control information 113b may, for example, be entered by viewers or users and include BAVT information (material) and optionally is supplied to the device 100 by means of MMS/SMS/e-mail/web form. The television sequence distributor 300, in the embodiment of FIG. 2, first includes means for manual correction 310, which converts the television sequence 104 to a corrected television sequence 105, which in turn is input into means for rendering transitions and animations 320, so as to finally generate the broadcasting sequence 106 therefrom.

The device 100 thus generates automatic sequences and representations and may optionally utilize methods of content-based feature extraction as well as classification and search of audio, image and video contents.

Figure 3:
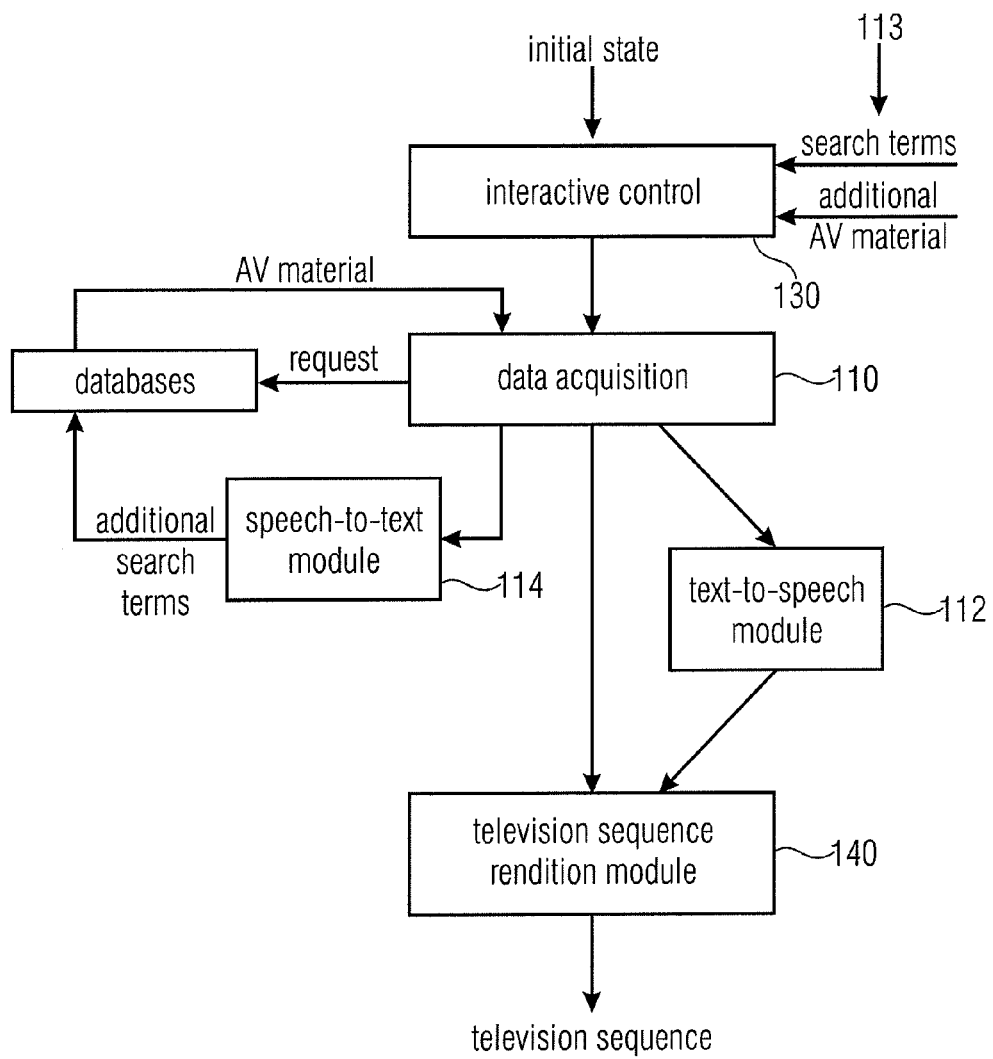
FIG. 3 is a flow chart for automatic generation of broadcasting sequences (television sequence), according to embodiments.

FIG. 3 shows an embodiment for the automatic generation of broadcast sequences (the television sequence 104), wherein the method comprises three components. A first component here is interactive control (the search request receiver 130 in FIG. 1 may be part thereof), the initial state of which is set by an administrator by inputting special search terms, for example. The search terms first set by the administrator may then constantly be changed or extended by viewers or users, for example. For example, users may supply further search terms to the interactive control via SMS, mobile phone, web form, etc., for example. Optionally, it is also possible that additional BAVT material is supplied to the interactive control, for example by the users or viewers.

The interactive control then controls data acquisition or a data acquisition module (e.g. the database interface 110 in FIG. 1), which for example sends a request to databases 200, using the search terms 113—both the specific search terms of the administrator and the search terms generated by the users. As a reply to the request, the databases 200 provide BAVT material, which is at first intermediately stored by the data acquisition module, for example. The data acquisition module may also forward speech-based search terms, for example supplied by the user via a mobile phone to the interactive control, to a speech-to-text module 114 generating additional search terms in form of a text message and forwarding the same to the databases 200, using the speech-based search terms. The database 200 in turn sends additional BAVT material back to the data acquisition module on the basis of these additional search terms.

The BAVT material may, for example, include music, images or videos or textual information, which may, in turn, be enhanced by meta data, for example, and which offers classification regarding its contents. Examples of databases 200 are image-based databases, such as FLICKR, or also text-based databases, such as the WIKIPEDIA encyclopedia.

Following the data acquisition, the generation of the TV program takes place in the television sequence rendition module 140, which joins the individual contents together on the one hand, and performs preprocessing of the content on the other hand. The television sequence rendition module 140 for example establishes transitions between different images or different audio sequences. Optionally, it is also possible that the data acquisition of text-based data (such as from encyclopedia WIKIPEDIA) at first sends to a text-to-speech module 112, which generates an audio signal, which in turn is forwarded to the television sequence rendition module 140, from the text-based data contents.

When joining BAVT material together in the television sequence rendition module 140, for example, BAVT material found for similar search terms can be grouped and output successively in time. Optionally, it is also possible to utilize the classification, which is possible via the meta data, for example, to sort e.g. BAVT material according to a certain content or atmosphere. In the case of music, chorus and verse subdivision (segmentation) can also be performed and enhanced with image material in a matching manner, possibly by way of repetition of image material in the case of repetitions of chorus. This combining of image and audio contents may further be refined so that audio analysis is performed in the segmentation, in order to detect times or rhythm, for example. This also enables fading in or out images corresponding to the time or rhythm.

The transitions between different BAVT data may be performed so as to correspond with the atmospheric profile, so that smooth transitions (slow fade-in and fade-out of images) are selected in the case of a quiet atmosphere, and hard transitions are chosen in the case of an aggressive atmosphere. Finally, the television sequence rendition module 140 may also perform processing of human faces, in order to make the human faces unrecognizable, for example, so that privacy remains protected. As a last step, textual information may optionally be fitted into the videos. The textual information may for example comprise the name of the owner of the corresponding material, or also advertising or further information material (for example from WIKIPEDIA).

Data sources can be subdivided into two groups. First, the multimedia data provided by the viewers so as to control the current program. This information may be images, text messages or voice messages sent via mobile telephones or alternative return channels available. The multimedia elements may be used directly as part of the television program or as seed media item within a similarity search procedure described in the following. The second group of data sources means integrating user-generated data from Internet platforms, such as Flickr, Wikipedia or blip.tv, offering a huge bandwidth of publicly accessible multimedia information.

Collaborative filter methods may for example be applied to enhance TV content recommendations through interactive feedback of a multiplicity of users. For this reason, it is advantageous if users of the interactive television services are monitored, e.g., regarding the kind of the input into the television services, so that user profiles can be established. The profiles of the users taking part in a current interactive television service can be compared so as to filter out the most relevant ones.

In the field of image analysis, two basic approaches are relevant. First, this is content-based image search or retrieval (CBIR—Content-Based Image Retrieval), wherein image samples are used as a request to an image database. Thereupon, similar images are returned on the basis of basic features (such as color histograms or spatial frequency information).

Figure 4A:
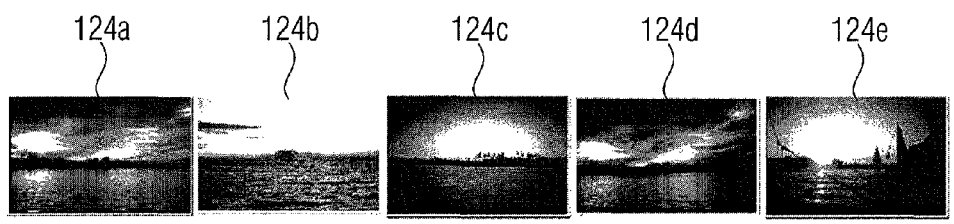
FIG. 4a shows an exemplary result for a content-based image query with visually similar images.

FIG. 4a shows a typical result of the CBIR algorithm for a content-based image query in a database, using a sample image, e.g. 124a. As a result, the database 200 for example provides five images 124a, 124b, 124c, 124d and 124e, with the images 124 showing visually similar motives (various sunsets). Correspondingly, the visually similar images, as shown in FIG. 4a, for example, can be used to graphically accompany a corresponding musical atmosphere (quiet or melancholy). Whether music rather is quiet or aggressive, may for example be found out on the basis of an examination of the time/rhythm (as part of the segmentation).

The second approach is based on a classification of image contents. This approach combines various pattern recognition and classification techniques (e.g. natural-scene classification or object recognition). The result consists of semantic descriptions of the entire image, e.g. landscape, city, people, or descriptions of parts of the image, e.g. grass, forest, beach, ocean, or specific comments on concrete objects, e.g. car, horse or Eiffel Tower.

Semantic audio analysis refers to the enhancement of digitized audio recordings with descriptive meta data markings allowing for enhanced database search or further processing. Nowadays, a meta data description of audio mostly is given by catalogue-oriented classification. Unfavorably, this marking according to predefined categories is troublesome and time-consuming. Automatic generation of content-based meta data promises a cost-efficient, scalable marking so as to provide robust and efficient results for close-to-reality applications. Regarding audio recovery on the basis of a keyword search, the genre and the atmosphere of a piece of music are its most interesting properties. The most recognized musical styles and atmospheric characteristics determined in user studies can be classified automatically in a monitored pattern recognition system, using data recovery and statistics methods. Other useful properties, such as the tempo, the time and the beat scheme, can be determined in a reliable manner. The algorithm for the analysis of time-related information can be used for automatic generation of image sequences in line with accompanying music. Furthermore, segmentation of the song structure represents an important prerequisite to take changes of the genre or the atmosphere within a song into account.

Figure 4B:
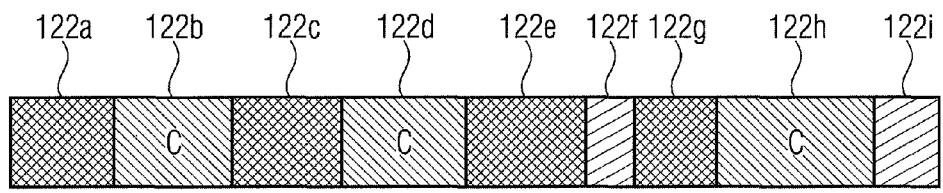
FIG. 4b shows an exemplary result of an algorithm for song structure segmentation.

FIG. 4b shows the result of a structural segmentation for a song, with segments carrying a label C if they have been identified as refrain (chorus). Altogether, nine segments 122a to 122i are shown in FIG. 4b, wherein the second segment 122b, the fourth segment 122d and the eighth segment 122h have been identified as a refrain. The remaining segments, that is the first segment 122a, the third segment 122c, the fifth to seventh segment 122e-g and the ninth segment 122i, do not comprise a refrain, wherein these segments possibly also comprise another classification, however, corresponding to the rhythm. The above-mentioned classification regarding the rhythm may, for example, be done by analyzing the length of the segments (e.g. longer portions indicate rather quiet music).

An efficient way of embedding additional music contents into a stream (television sequence 104) is the content-based music request for similar music for the case that no semantic markings are available. The determination of similarity relations between a requested song and a larger song catalogue may provide relevant playlists. While the system is extended through modeling user preferences and integration of feedback regarding the relevance (relevance feedback), the quality of recommendation could be improved significantly. The feedback may, for example, be used to successively adapt such playlists.

The application of content-based music identification via a call (e.g. of a mobile telephone), wherein the mobile telephone is held close to a loudspeaker, for example, offers further possibilities of interaction.

In addition to a mere image or mere audio analysis, multi-mode analysis may also be performed, wherein a multi-mode or comprehensive-mode analysis process includes audio and visual media. A typical multi-mode analysis application is a music player using photos for visualizations. The combination aspect of the modality could be the music and image atmosphere or emotional effects. The music visualization may also be evaluated with user tests to measure the user perception. The emotion-based combination of music and photos can be compared with visualization by conventional media players and/or a slide show with random photos. The user test reveals intensified user experience and stronger acceptance of the atmosphere-based combination of music and photos. For this reason, comprehensive-mode application of multimedia elements on the production of television programs should be applied, which entails the test user experience, instead of processing audio and visual data individually.

The enhancement of the interactive TV service can be realized by developing server components in a digital TV playout environment. The core of the architecture is streaming-oriented data exchange between core modules, e.g. an MPEG-2 transport stream multiplexer, a video coder and object carousel generating means. Furthermore, a content, scheduling and administration server controls the entire system and the interaction between the components.

Figure 5:
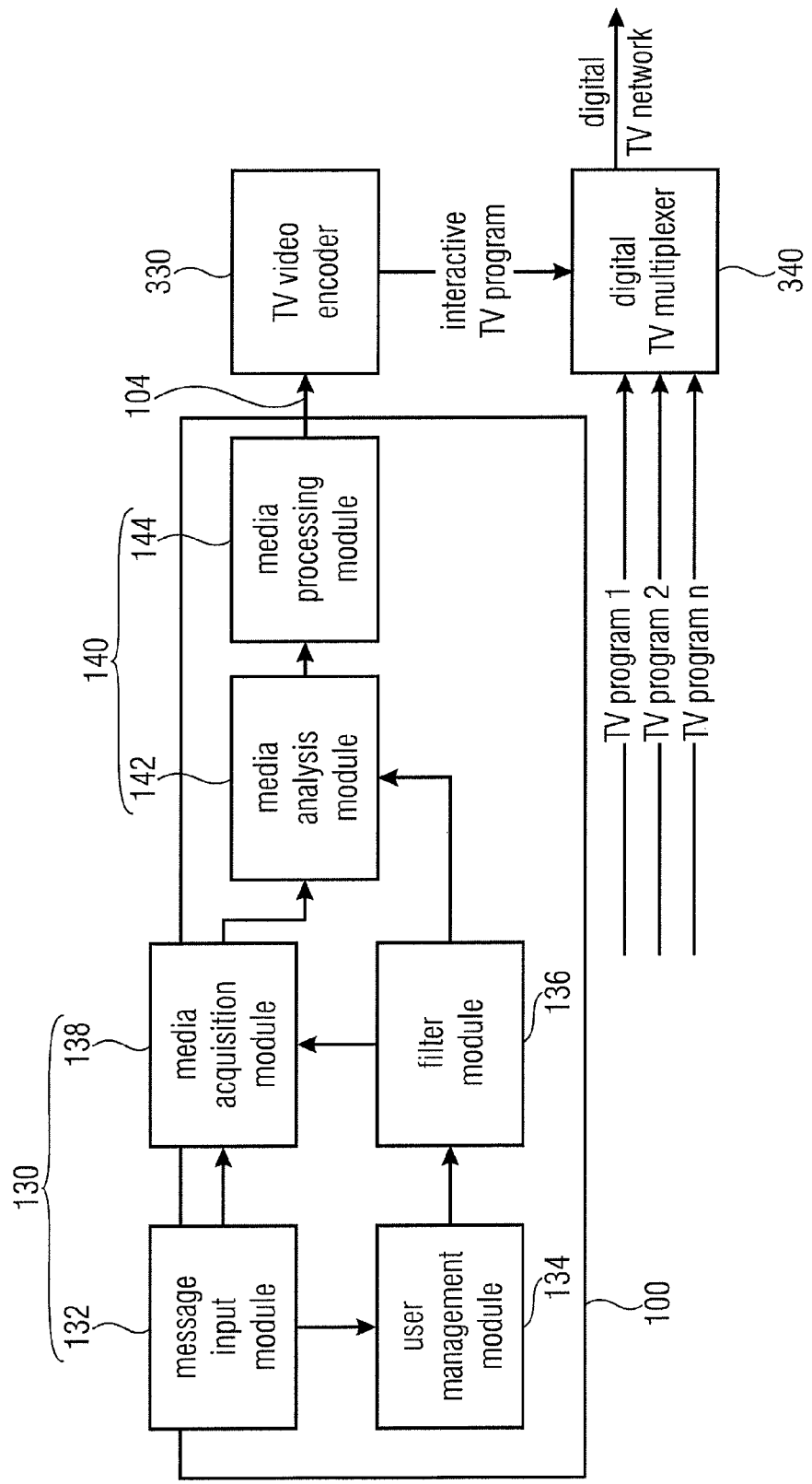
FIG. 5 is an illustration for a server architecture to enhance interactive television.

FIG. 5 shows a further embodiment, wherein the search request receiver 130 comprises four modules, and the television sequence rendition module 140 two sub-modules, for example. In detail, in this embodiment, the search request receiver 130 comprises a message input module 132, a user management module 134, a filter module for registered users 136 and a media acquisition module 138. The television sequence rendition module 140 includes at first a content-based media analysis module 142 and a media arrangement and preparation module or media processing module 144 as sub-modules. Media processing for example includes scheduling (time-planning or joining together) and preprocessing. Furthermore, the television sequence distributor 300 comprises a digital TV video encoder 330 and a digital TV multiplexer 340.

Thus, users can send messages to the device 100 via the message input module 132, wherein the messages may for example be sent by means of SMS, MMS, e-mail or web form. The messages may for example comprise search terms 113, which then are sent to the media acquisition module 138. At the same time, the user management module 134 may analyze the incoming messages with respect to the senders and determine whether the messages originate from a registered user, for example. Optionally, the filter module 136 may weight the message according to whether the user or the sender of the message is a registered user or not. For example, the search term 113 may be used directly for registered users, in order to perform acquisition of the media data by means of the media acquisition module 138. For example, a minimum number of users may be necessitated for non-registered users until the search term 113 for media acquisition is accepted. Alternatively, non-registered users may only participate in votings—but not generate search terms 113 of their own.

After the media data has been queried from a database by the acquisition module 138 (not shown in the embodiment of FIG. 5), the above-described examination regarding the content of the media data takes place in the content-based media analysis module 142, wherein the media data may include both image contents 124 and audio contents 122. In the module for generating the broadcast sequences 144 (media processing module), corresponding adaptation of both the audio and video data, and particularly a rendition of the corresponding transitions between the various data takes place. The television sequence 104 thus obtained then is input in the digital TV encoder 330, which generates an interactive TV program, which then is input into a digital TV multiplexer 340. The interactive TV program thus obtained can be combined with other TV programs from other sources (for example, program 1 to TV program n) and for example fed into a digital TV network (e.g. cable).

Hence, in embodiments, special modules for media acquisition, multimedia analysis and for collaborative filtering are integrated for the enhancement of TV programs or TV services, as summarized in the following. The processing chain depicted shows an abstract procedure for interactive TV generation services including the handling of user messages communicated via mobile telephones or other return channels, such as e-mail.

The messages may be filtered as described above, so that registered users can start and/or influence the collaborative filter module, which searches for comprehensive interest with respect to other registered users. In the next step, media acquisition is performed if it is necessitated for the selected service. Thereafter, the content-based analysis module processes audio, image and video data with respect to semantic indices and similarity. The last module of the enhancement chain performs the scheduling and processing of multimedia elements, also using content-based analysis methods. The procedures may be different, depending on the kind of application.

The enhancement strategies for interactive television services may be described as follows. On the basis of the predefined system architecture and the content-based and collaborative filter method shown, many strategies for enhancing interactive services (generating the television sequence 104) are possible.

For example, text messages from users can be analyzed for keywords so as to find matching multimedia elements in multimedia databases, which are provided with automatically- or user-generated comments, in order to integrate this content into the broadcast.

Multimedia messages from users may also be used as a request in content-based retrieval systems (query system or so-called retrieval systems) in order to obtain similar multimedia elements for the television sequence.

Furthermore, the audio content or speech from the users can be analyzed for keywords or matching pieces of music. The keywords and song titles may, for example, be used to query multimedia elements.

For example, a user group could generate an intelligent playlist in remotely controlled manner so as to control video clips or music on the basis of user feedback regarding the relevance in a controlled manner.

The media thus collected (BAVT-material) may be scheduled and rendered automatically in a comprehensive-mode manner, in order to offer users/viewers an optimum experience.

Following the described enhancement strategies, several concrete service scenarios are possible. By way of example, the services: Intelligent Playlist Generator (IPG) and Theme Broadcast Generator (TBG) will be described in detail.

Figure 6A:
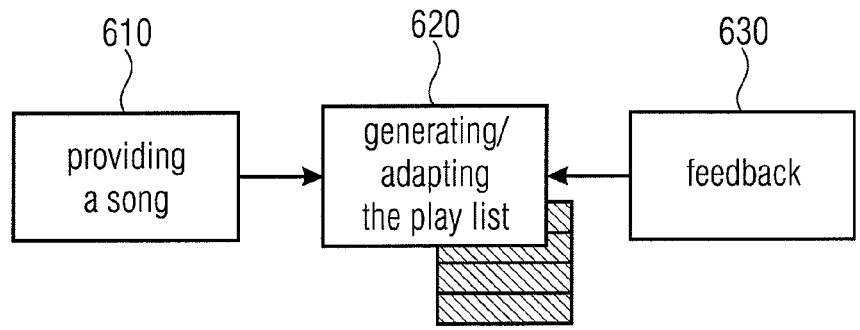
FIG. 6a is an illustration for interactive generation of a playlist.

FIG. 6a shows a flow chart for generating a playlist and its adaptation. Here, in a first step 610, at first a song, which for example represents a starting value in the playlist 620, is filed or provided by a user (e.g. a registered user). Based on this song, the device for example establishes a list of similar titles, which may then be played. In a further step 630, there is feedback by other users who for example rate the title sound correspondingly, for example via a poll or voting, and hence produce a ranking in the playlist. By constantly replacing the titles rated worst, a playlist may thus be improved and adapted successively.

The IPG service describes an interactive service for dynamic playlist generation at the example of music. The basic concept may also be applied to the image field as a slide show or in combination as a music/slide show service.

The concept of the IPG service shown schematically may be put into more concrete terms as follows. So as to start the service, a user or the administrator of the services sets a so-called seed song, which is used by a music acquisition algorithm. The music acquisition algorithm searches a music database to obtain a first playlist of similar songs. In the further course of the service, the playlist becomes longer and changes. The provision (submission) of such a song can be handled on the basis of the song title via a text message or via mobile telephone music identification. The identified song is provided to the IPG. Following the initialization of the service, users may give feedback on currently played songs (e.g. voting). A relevance feedback algorithm benefits from the continuous user feedback and adapts the playlist. In the worst case of mass rejection, the currently played song is stopped, and an alternative song is chosen. The voting results can be displayed on the screen to extend the user experience. Apart from the voting approach, additional songs can be submitted for the purpose of a more direct control of the IPG on the basis of several seed songs and playlist aggregation algorithms. This method may be expanded to a service resembling a multiplayer game: "find and submit various songs of a special musical genre until the LPG plays your genre". As an alternative thereto, the collaborative filter module may be enabled to also include already existing music preferences of registered users.

Regarding the music/slide show version of this service, additional techniques for merging audio and visual content are applied, e.g. atmospheric classification. Furthermore, an audio beat analysis is applied so as to change images exactly at music beats. Segmentation of the song structure is applied so as to repeat the same images within each refrain of a song.

In principle, the voting approach is conceivable for mass interaction, while the submission approach (i.e. each user may provide material themselves) should be used with a limited number of users.

Figure 6B:
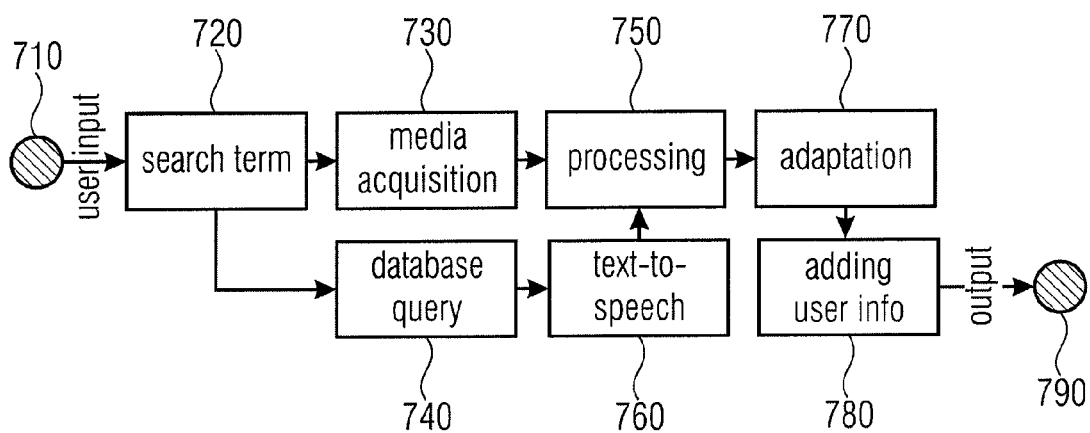
FIG. 6b is a flow chart for a thematic AV generator.

FIG. 6b shows a flow chart for a theme AV generator (TBG), which automatically generates a program, and wherein a user again submits a search term in a first step 710, for example. In a second step 720, the search term is used to query a database, wherein multimedia data is acquired in a third step 730, and the knowledge-based databases are queried optionally in a fourth step 740. The knowledge-based database query thus provides text, which may be converted to speech in a sixth step 760 and is available for medially joining together. In a fifth step 750, on the one hand, the multimedia data is combined with the textual information converted to speech and joined together, wherein the transitions can be adapted correspondingly in a seventh step 770. In an eighth step 780, the multimedia data can be provided with relevant user information data. The material thus obtained finally is output in a last step 790 and/or made available to the television sequence distributor 300.

The TBG service thus describes an interactive television service, which bases a television program on the basis of an available multimedia content compiled or composed on the basis of a keyword search. The service may also be described in detail as follows: Initially, keywords for a special topic, e.g. in "New Zealand" are provided. The initial keywords can be set by a previously registered user via a text message, or a service administrator. By way of inclusion of these keywords, a multimedia search is performed on various multimedia platforms, e.g. Flickr.com, so as to acquire initial content for the TBG. Apart from the multimedia content, knowledge databases, such as Wikipedia.org, are searched for textual content that can be used as audio content with text-to-speech synthesis. Additional musical content may, for example, be selected on the basis of an atmospheric classification of the queried images and an atmospheric-based search in marked or semantic indicated music databases.

By combining and scheduling queried and generated multimedia data, a theme broadcast can be generated without any production costs, with the exception of possible license fees. The last step is focused on devising transition effects, such as between images. For this reason, the above-described atmospheric classification as well as predefined transitions can be employed in atmospheric profiles suitable for smooth cross-fadings, e.g. quiet and melancholy.

While the initially queried content is being sent, users may send text messages with additional keywords matching the theme, for example "Milford Sound, Queens Town, Abel Tasman" for the example of "New Zealand". These keywords provided interactively enhance the original theme broadcast with additional multimedia content, which is integrated dynamically. So as to encourage users to take part in the TBG service, nicknames or images of the user can be shown in the program together with the content for which the user is responsible.

Embodiments of the present invention thus are particularly applicable to the automated generation of TV broadcast contents, which are used in local TV cable networks or cable head stations offering local TV programs, for example. Applications in fields where a varied range of TV offers is to be made available within a short time with limited financial resources, but resources for content maintenance hardly are available, are of particular interest here. The TV program offered may for example be used for entertainment, but also for information purposes.

For local television offers, the embodiments also open up possibilities of filling unused broadcasting times with contents of local interest and may be user-generated contents, in which photo captures of local events and maybe music by local artists or image material matching the music of a regional radio station are arranged corresponding to the atmosphere by the automated method, for example.

Further applications also result when producing contents for mobile television, for example, wherein, at present, radio programs also are broadcast as television, and simply images of CD covers are displayed in the video image. Here, images from an image pool (database matching in rhythm and atmosphere) could be displayed automatically, accompanying the music, if necessitated. Through the variation of the contents and the automatic selection, a significant increase in value can be achieved with little effort. Embodiments also include the possibilities of promoting local communities with the aid of the previously mentioned means.

The incorporation in this area can be realized as a module developing and filing content management systems for the so-called playout of mobile television, for example.

Embodiments also include generating a video stream and the ensuing transmission of the video stream to a plurality of users/viewers, without the viewers necessarily taking influence on the generation of the video stream (i.e. not interactively). This may for example be done for a regionally limited region (e.g. a city or a coverage region of a cable provider).

The most successful interactive TV applications include television services utilizing mobile messaging services, such as SMS chats. Furthermore, embodiments provide novel approaches for the enhancement of mobile messaging services, using content-based and collaborative filter methods. By way of example, there is disclosed a content and playout server, which can be used for integrating interactive television services into digital TV networks. Furthermore, there are described developed-content-based analysis algorithms capable of enhancing the user experience of mobile messaging services as well as offering opportunities for novel services at lower service production cost. The new approaches are focused on automated acquisition of multimedia content as well as on intelligent content scheduling and rendition.

In summary, embodiments can be characterized as follows. They include enhancing interactive television services with collaborative and content-based filter methods. There is described an approach for enhancing mobile messaging services comprising content-based and collaborative filter methods. The content and playout system architecture is described. The content-based analysis algorithms and their potential employment in enhancement components are disclosed. Two service concepts have been described in detail so as to explain the application of the content-based algorithms in a process of generating interactive television programs. Summarizing the results, what has been realized is a basic system for prototype interactive services.

Hence, embodiments describe, in particular, collaborative and content-based filtering as well as enhancing interactive television services.

In particular, it is pointed out that, depending on the conditions, the scheme according to the invention may also be implemented in software. The implementation may be on additional storage medium, particularly a disc or CD with electronically readable control signals capable of cooperating with a programmable computer system so that the corresponding method is executed. In general, the invention does also consist in a computer program product with program codes stored on a machine-readable carrier for performing the method according to the invention, when the computer program product is executed on a computer. In other words, the invention may thus also be realized as a computer program with program code for performing the method, when the computer program is executed on a computer.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. Device for providing a television sequence comprising:
a database interface for accessing at least one database, using a search request;
a search request receiver formed to control the database interface so as to acquire an audio content and an image content separate from the audio content via the database interface in response to the search request, wherein the audio content or the image content comprises content data;
a television sequence rendition module for combining the audio content and the image content to generate the television sequence based on the audio content and the image content; and
an output interface for outputting the television sequence to a television sequence distributor,
wherein the device further comprises a memory to store the audio content or the image content and wherein the device is configured to classify the audio content or the image content obtained in response to the search request corresponding to the content data, so that the audio content or the image content are classified regarding their contents,
wherein the search request receiver is formed to query and acquire a further queried audio content and a further queried image content subsequent to and depending on the classification of the audio content or the image content obtained in response to the search request regarding their contents, wherein the further queried audio content or the further queried image content is different from the audio content or the image content, and
wherein the television sequence rendition module is formed to additionally combine the further queried audio content or the further queried image content into the television sequence, and wherein the television sequence rendition module is formed to generate the television sequence such that a change from the audio content to the further audio content temporally matches a change from the image content to the further image content.

2. Device according to claim 1, comprising the database, the database comprising first and second data sources spatially separated from each other, wherein the database interface is formed to query the audio content from the first data source and query the image content from the second data source.

3. Device according to claim 1, wherein the database interface is formed to access further text-based databases and query textual information responsive to the search query.

4. Device according to claim 3, further comprising a text-to-speech module, wherein the text-to-speech module is formed to convert the textual information into additional audio contents and forward the same to the television rendition module.

5. Device according to claim 1, wherein the database interface is formed to determine a further search request from the audio content.

6. Device according to claim 1, wherein the audio content comprises a bar or a refrain with a beginning and an end, and wherein the television sequence rendition module is formed to match a change from the image content to the further image content with the bar or with the beginning or the end of the refrain.

7. Device according to claim 1, wherein the search request comprises static control information or dynamic control information, wherein the dynamic control information depends on an input from users having received the television sequence.

8. Device according to claim 7, wherein the television sequence distributor is formed to communicate the television sequence to the users, and wherein the search request receiver is formed to acquire the dynamic control information in form of a message from users.

9. Device according to claim 8, further comprising a user management module, wherein the user management module is formed to register particular users of the device, wherein the search request receiver is formed to process dynamic control information from the particular users differently than dynamic control information from the users.

10. Device according to claim 1, wherein the search request receiver is formed to acquire a continuous audio stream and a multiplicity of image contents, and wherein the television rendition module is formed to acquire the television sequence by combining the multiplicity of image contents into the continuous audio stream.

11. Device according to claim 1, wherein the search request receiver is formed to acquire an image sequence and a multiplicity of audio contents, and wherein the television rendition module is formed to acquire the television sequence by combining the multiplicity of audio contents into the image sequence.

12. Device according to claim 1, further comprising corrector for manual correction of audio or image contents or renderer for rendering transitions between audio and image contents.

13. Device according to claim 1, wherein the audio content of the image content comprises content data, and wherein the television sequence rendition module is formed to enhance the audio content or the image content by textual information on the basis of the content data.

14. Device according to claim 12, wherein the content data designates a genre of the audio content or the image content, and wherein the television sequence rendition module is formed to perform the combining of the audio content and the image content corresponding to the genre.

15. Device according to claim 14, wherein the television sequence rendition module is formed to fade the image content in or out depending on the genre.

16. Device according to claim 1, wherein the television rendition module is formed to fade in context-dependent additional information into the television sequence.

17. Device according to claim 1, wherein the television sequence rendition module is formed to recognize human faces from the image content and distort recognized human faces.

18. Method of providing a television sequence, comprising:
- accessing a database by a database interface, using a search request;
- controlling the database interface by a search request receiver to acquire audio content and image content separate from the audio content via the database interface in response to the search request, wherein the audio content or the image content comprises content data;
- combining the audio content and the image content by a television sequence rendition module to generate the television sequence based on the audio content and the image content; and
- outputting the television sequence by an output interface to a television sequence distributor,
- wherein the audio content or the image content is stored in a memory and the audio content or the image content is classified corresponding to the content data, so that the audio content or the image content are classified regarding their contents,
- wherein a further queried audio content and a further queried image content is queried and acquired subsequent to and depending on the classification of the audio content or the image content obtained in response to the search request regarding their contents by the search request receiver, wherein the further queried audio content or the further queried image content is different from the audio content or the image content, and
- wherein the further queried audio content or the further queried image content is additionally combined into the television sequence by the television sequence rendition module, and wherein the television sequence rendition module is formed to generate the television sequence such that a change from the audio content to the further audio content temporally matches a change from the image content to the further image content.

19. A non-transitory storage medium having stored thereon a computer program with program code for performing, when running on a processor, the method of providing a television sequence, the method comprising:
- accessing a database by a database interface, using a search request;
- controlling the database interface by a search request receiver to acquire audio content and image content separate from the audio content via the database interface in response to the search request, wherein the audio content or the image content comprises content data;
- combining the audio content and the image content by a television sequence rendition module to generate the television sequence based on the audio content and the image content; and
- outputting the television sequence by an output interface to a television sequence distributor,
- wherein the audio content or the image content is stored in a memory and the audio content or the image content is classified corresponding to the content data, so that the audio content or the image content are classified regarding their contents,
- wherein a further queried audio content and a further queried image content is queried and acquired subsequent to and depending on the classification of the audio content or the image content obtained in response to the search request regarding their contents by the search request receiver, wherein the further queried audio content or the further queried image content is different from the audio content or the image content, and
- wherein the further queried audio content or the further queried image content is additionally combined into the television sequence by the television sequence rendition module, and wherein the television sequence rendition module is formed to generate the television sequence such that a change from the audio content to the further audio content temporally matches a change from the image content to the further image content,
- when the computer program is executed on a computer.

* * * * *

UNITED STATES PATENT AND TRADEMARK OFFICE
CERTIFICATE OF CORRECTION

| | | |
|---|---|---|
| PATENT NO. | : 8,566,880 B2 | Page 1 of 1 |
| APPLICATION NO. | : 13/011563 | |
| DATED | : October 22, 2013 | |
| INVENTOR(S) | : Peter Dunker et al. | |

It is certified that error appears in the above-identified patent and that said Letters Patent is hereby corrected as shown below:

On the Title Page, (73) Assignee:

Fraunhofer-Gesellschaft zur Foerderung der Angewandten Forschung E.V.

should be:

Fraunhofer-Gesellschaft zur Foerderung der angewandten Forschung e.V.

In the Claims

Column 16, line 38, Claim 9:

9. Device according to claim 8, should be:

9. Device according to claim 7,

Signed and Sealed this
Second Day of December, 2014

Michelle K. Lee
*Deputy Director of the United States Patent and Trademark Office*